(12) United States Patent
Lewis et al.

(10) Patent No.: US 6,467,432 B1
(45) Date of Patent: Oct. 22, 2002

(54) POULTRY HOUSE LITTER IMPLEMENT

(75) Inventors: Robert L. Lewis; Carl J. Thomas, both of Baxley, GA (US)

(73) Assignee: Lewis Bros. Mfg., L.L.C., Baxley, GA (US)

( * ) Notice: Subject to any disclaimer, the term of this patent is extended or adjusted under 35 U.S.C. 154(b) by 0 days.

(21) Appl. No.: 09/968,910

(22) Filed: Oct. 3, 2001

(51) Int. Cl.⁷ .............................. A01K 31/04; A01D 7/02
(52) U.S. Cl. ..................... 119/442; 119/451; 56/400.01; 56/400.21; 172/540; 172/554
(58) Field of Search ........................... 119/442, 447, 119/451, 479, 166; 56/3, 194, 342, 367, 400.01, 400.02, 400.05, 400.07, 400.21; 172/540, 541, 547, 554

(56) References Cited

U.S. PATENT DOCUMENTS

| | | | |
|---|---|---|---|
| 3,044,753 A | | 7/1962 | Wilcox, Jr. |
| 3,533,121 A | | 10/1970 | Kershaw |
| 3,649,984 A | | 3/1972 | Kershaw et al. |
| 3,662,420 A | | 5/1972 | Jordan, Jr. |
| 4,424,869 A | * | 1/1984 | vom Braucke et al. ...... 172/349 |
| 4,897,183 A | | 1/1990 | Lewis, Jr. et al. |
| 5,040,617 A | * | 8/1991 | Bussiere ...................... 172/177 |
| 5,148,569 A | | 9/1992 | Jailor et al. |
| 5,213,164 A | * | 5/1993 | Mork ....................... 172/445.1 |
| 5,540,004 A | * | 7/1996 | Patterson et al. ............... 15/55 |
| 5,850,882 A | * | 12/1998 | Link ............................ 172/112 |
| 5,967,242 A | * | 10/1999 | Caron et al. ................. 172/508 |
| 6,092,394 A | | 7/2000 | Backer et al. |
| RE36,847 E | * | 9/2000 | Waters ......................... 119/163 |
| 6,378,461 B1 | * | 4/2002 | Thaler et al. ................ 119/166 |

* cited by examiner

*Primary Examiner*—Yvonne R. Abbott
(74) *Attorney, Agent, or Firm*—Shoemaker and Mattare

(57) ABSTRACT

A tractor-drawn implement for breaking up caked litter on the floor of a poultry house includes a stationary blade which passes beneath the surface of the litter and a rotary rake whose tines are flattened and are inclined at an oblique angle to radial planes of the rake. The tines break up caked litter as they turn; their inclination causes sweeps the litter particles toward one end of the blade, away from the wall of the house.

9 Claims, 3 Drawing Sheets

POULTRY HOUSE LITTER IMPLEMENT

BACKGROUND OF THE INVENTION

1. Field of the Invention

This invention relates generally to an implement for loading and separating the litter bases normally found in poultry houses.

2. Description of the Prior Art

A typical poultry house has a flat dirt floor on which about six inches of litter material, such as sawdust, wood shavings, rice hulls or cut wheat straw, is evenly distributed before starting the baby chicks on feed and water. After six to eight weeks of feeding and watering, the 20,000 to 40,000 birds in the house will have contaminated and encrusted the litter material.

In the past, the house was cleaned occasionally by removing all the litter from the floor, and replacing it with fresh litter. In the interim, additional litter was added periodically, and the depth of accumulated used litter would raise the effective floor height substantially between cleanings.

The machine described in U.S. Pat. No. 4,897,183 enabled one for the first time to separate the waste portion of litter from the clean portion. That machine automatically loaded the waste portion into a storage or holding container, while returning the clean portion to the floor of the poultry house.

Litter reconditioning machines use a scoop or loader to pick the litter up off the floor. The litter is not necessarily loose: excrement or water may have consolidated the litter particles, or at least an upper portion thereof, into a solid mass which must be broken up before it can be collected.

Another problem is that it is difficult to clean poultry house floors right up to the walls, because protrusions such as pillars and wall studs get in the way of most machinery. It would be advantageous to have a machine which avoided such obstacles automatically.

SUMMARY OF THE INVENTION

An object of the invention is to break up caked poultry house litter so that it can be properly handled and screened.

A further object is to provide an implement which automatically follows the contour of litter house walls, and moves the litter away from the walls so that it can be collected.

These and other objects are met by a device for breaking up caked litter on the floor of a poultry house, as described in detail below. The device includes a rotary rake having flat tines which extend along radii perpendicular to the axis of the rake, and which are aligned at an angle oblique to the radial plane of the rake.

DESCRIPTION OF THE PREFERRED EMBODIMENT

Figure 1:
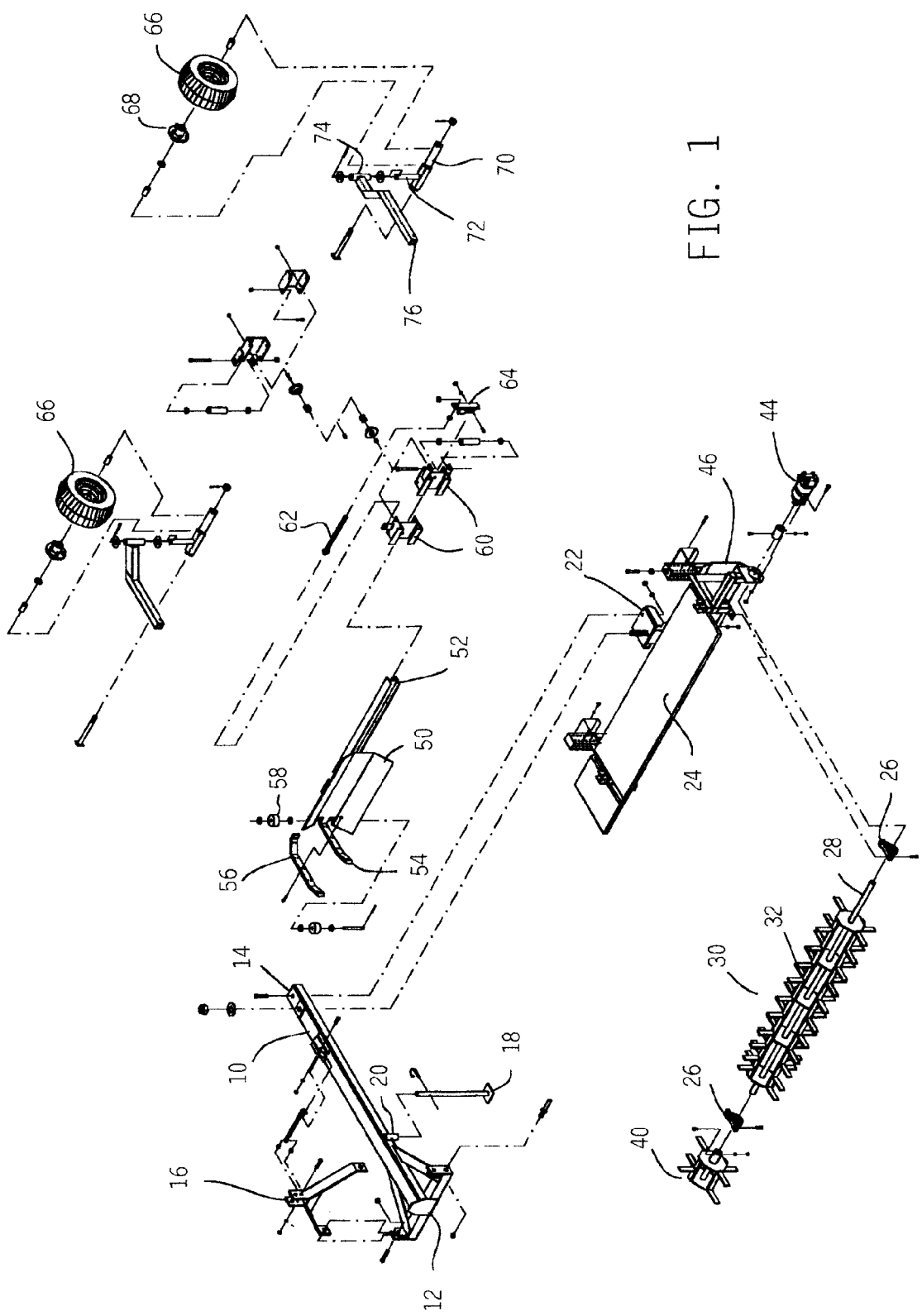
FIG. 1 is an exploded perspective view of an implement embodying the invention.

As seen in FIG. 1, the implement includes a tow bar 10 having a forward end 12 adapted for connection to the rear of a tractor, and a rearward end 14. The brace 16 allows one to lift the implement when necessary. The removable stand 18 seats in a socket 20 to hold up the tow bar when the machine is removed from the tractor.

Figure 2:
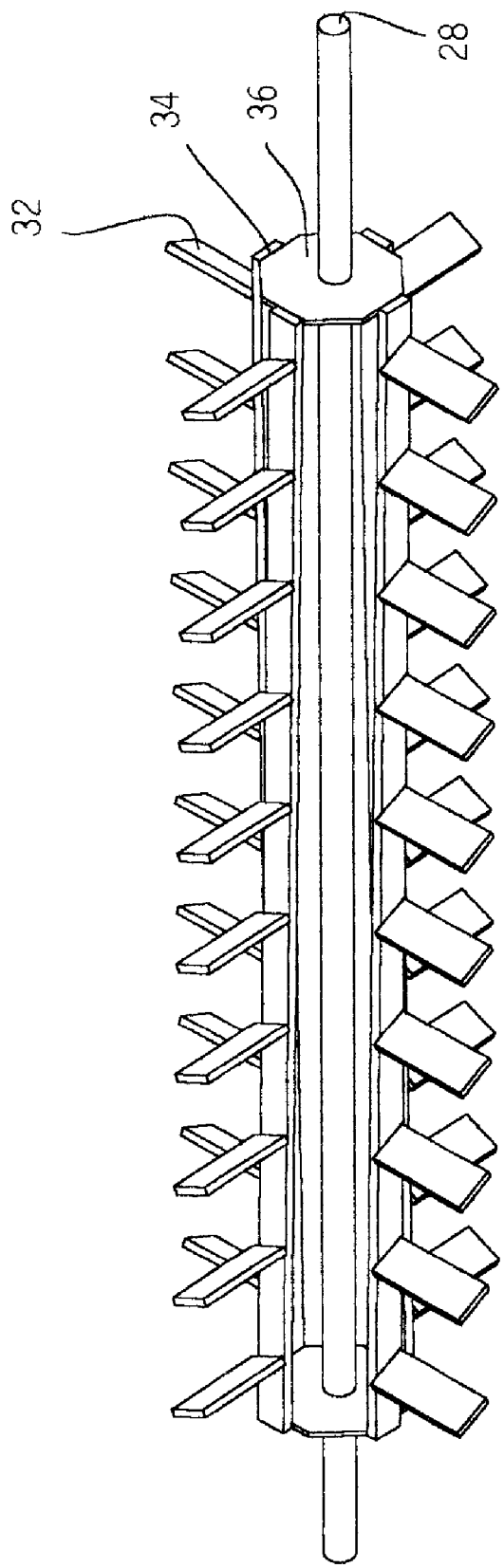
FIG. 2 is a perspective view of a rake forming part of the implement.
Figure 3:
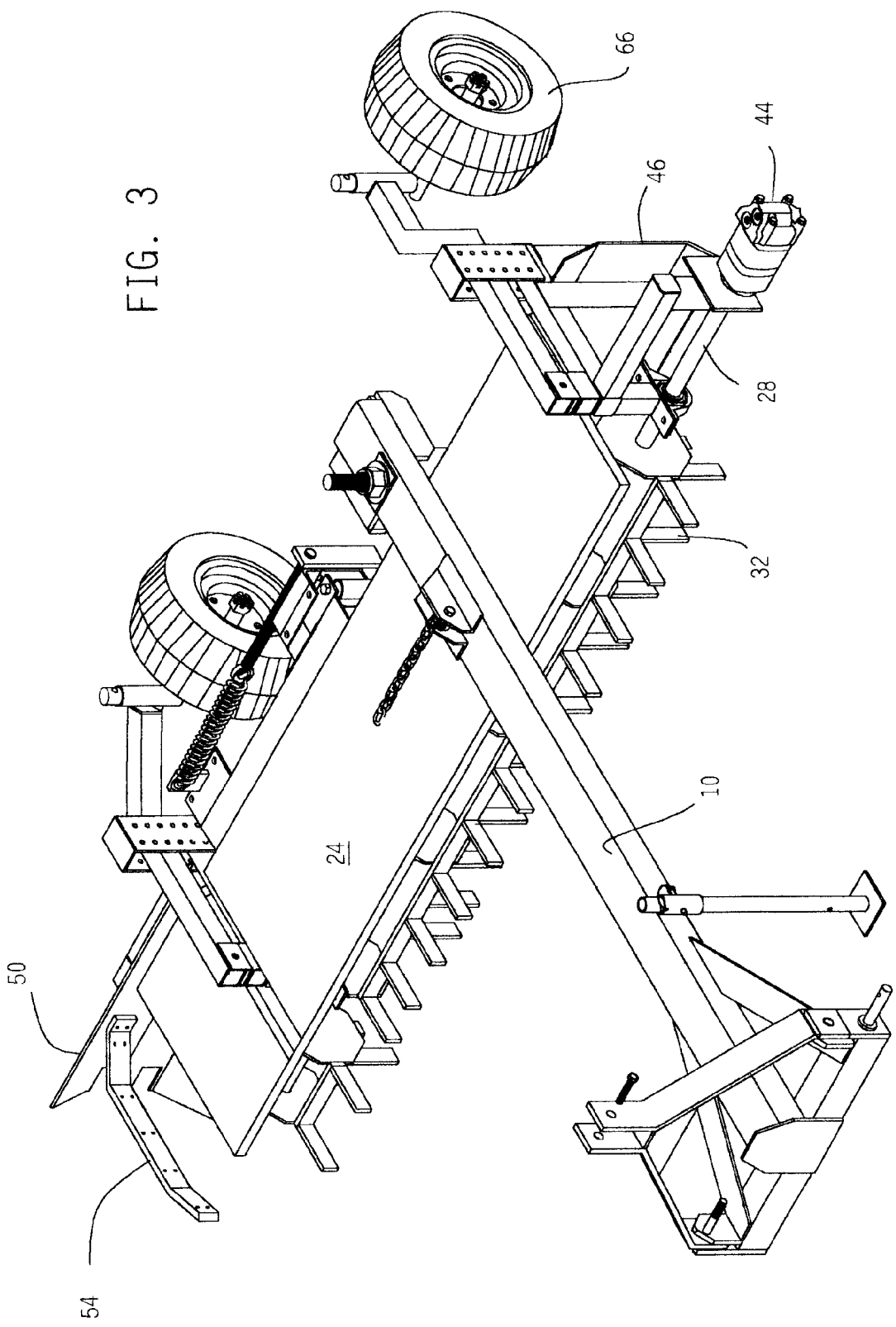
FIG. 3 is an assembled perspective view of the implement shown in FIG. 1.

The rear end of the tow bar is connected to a pad 22 protruding up from a base plate 24. Brackets affixed to the base plate support bearings 26 supporting the axle 28 of a rotary rake 30 having an array of tines 32. As seen in FIG. 2, the tines are welded to steel strips 34 which are welded to an evenly spaced array of octagonal plates 36; these in turn are welded to the axle.

The rake's tines are preferably straight and extend along radii perpendicular to the shaft axis; however, it is possible that curved tines could be used, in which case the tines would be described as extending in a generally radial direction. It is also possible that the tines could be inclined axially so as to make an oblique angle to the axis of rotation, although no benefit in such an arrangement is currently seen.

An important feature of the invention is that the tines are flat, that is, each tine has a cross-section characterized by maximum and minimum dimensions which have a ratio of at least 2:1. Most preferably, the tines have a rectangular cross-section, and ratio of the lengths of the sides is at least 4:1. In any event, the maximum dimension defines a major axis of the cross-section, and that major axis is neither parallel to the axis of rotation, nor in a radial plane of the rake. By "flat", we mean that the major axis of the cross-section of each tine is oblique to a radial plane of the rake. (A radial plane is perpendicular to the axis of rotation.) The preferred inclination angle is 27° to a radial plane; however, other oblique angles may prove workable. It is also preferred that all the tines have an identical inclination angle, however, substantial variations from a nominal angle may prove harmless.

Referring again to FIG. 1: The ends of the axle extend through the bearings, and a short auxiliary rake 40 is fixed to the left end of the axle, while a hydraulic PTO motor 44 is connected to the right end. A fixed blade 46 is affixed to the rear of the base plate.

Behind the rake, there is a movable blade 50, which overlaps the fixed blade and is supported on an I-beam 52. A steel wall guide 54 is affixed to the left end of the blade, and a conforming polymeric shoe 56 covers the wall guide, to protect the house wall. A pair of rollers 58 are also provided at the end of the blade. These are mounted so as to extend just slightly beyond the outer surface of the shoe, so that the rollers normally engage flat wall surfaces, to protect the shoe from wear. The guide shoe comes into play when an obstacle is encountered.

The I-beam 52 is slidably received in pockets defined by blade support brackets 60. It is driven leftward by a tension spring 62, connected between a tab on one of the brackets 60, and a small bracket 64 bolted to the right end of the I-beam. Thus the spring tends to extend the movable blade. The angled end of the guide shoe allows the movable blade to retract when an obstacle protruding from the wall is met.

The wheels 66, mounted on hubs 68, turns on stub axles 70. The stub axles are welded to king pins 72 which extend through knuckles 74 fixed at the ends of frame members 76 connected to the base plate.

In operation, the implement is towed through a poultry house. As the machine travels along, the blade, which may be set to just skim the floor, or at a higher level below the top of the cake, grades the cake to the desired level. The caked litter must be broken up into pieces, and for this reason the rotary rake or beater is positioned above and just ahead of the blade. The hydraulic motor turns the rake in a direction opposite to the direction of rotation of the wheels, so that pieces of caked litter are brushed ahead of the implement. With the tines obliquely inclined as described above, the litter pieces move away from the house wall as they are repeatedly struck by the tines. The litter is thus formed into windrows well away from the wall, where it can be collected by a separate machine.

One could achieve the effect described above by twisting the ends of the tines so that at least the tips of the tines lay oblique to radial planes of the rake. In such a case, it is possible that each tine could have a major axis which lay within, or perpendicular to a radial plane at some point along its length, such as at its root, while the tips were oriented obliquely according to the principle of this invention. It is also possible that the cross-sectional shape might vary from root to tip. For example, each tine could have a non-flat cross-section over a portion of its length, say at the root, as long as its was flat at the tip.

When the implement is being used to collect litter near the house wall, the tractor is positioned so that the blade is substantially extended, but with the spring urging the movable blade outward into contact with the wall. The rollers normally run along the wall, preventing abrasive wear to the implement and the wall; however, when a protruding obstacle is encountered, the beveled leading edge of the guide shoe pushes the end of the movable blade inward to prevent damage. Once the obstacle is cleared, the spring extends the blade once more.

Inasmuch as the invention is subject to variations and modifications, it is intended that the foregoing drawings and description be interpreted as merely illustrative of the invention defined by the following claims.

I claim:

1. An implement for engaging and lifting litter from the floor of a poultry house, the implement comprising
    a base plate,
    a stationary blade affixed to the base plate, and
    a rotary rake for breaking up caked litter lifted from the floor by the blade, the rotary rake having an axis of rotation and. a plurality of tines extending in substantially radial directions, wherein at least a majority of said tines have a tip portion whose cross-section is substantially flattened and has a major axis which is aligned at an oblique angle to a radial plane of the rake.

2. The invention of claim 1, wherein substantially all of said tines have substantially the same oblique angle.

3. The invention of claim 2, wherein said oblique angle is about 45°.

4. The invention of claim 1, wherein each tine has a uniform cross-section.

5. The invention of claim 1, wherein each tine is substantially straight.

6. The invention of claim 5, wherein each tine extends along a radial line perpendicular to said axis of rotation.

7. The invention of claim 1, wherein said cross-section has a major dimension and a minor dimension whose ratio is at least 2:1.

8. The invention of claim 7, wherein said cross-section is rectangular, and said ratio is at least 4:1.

9. The invention of claim 1, wherein further comprising a movable blade overlapping the fixed blade, a structure for supporting the blade from the base plate, means for resiliently biasing the movable blade away from the fixed blade, and a guide structure for pushing the movable blade back in the direction of the fixed blade when an obstacle is encountered.

* * * * *